(12) United States Patent
Takuma et al.

(10) Patent No.: US 10,983,380 B2
(45) Date of Patent: Apr. 20, 2021

(54) DISPLAY DEVICE

(71) Applicant: Japan Display Inc., Minato-ku (JP)

(72) Inventors: Masaaki Takuma, Tokyo (JP); Mao Izawa, Tokyo (JP); Hisanori Kawakami, Tokyo (JP); Susumu Kimura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/839,484

(22) Filed: Apr. 3, 2020

(65) Prior Publication Data

US 2020/0319495 A1    Oct. 8, 2020

(30) Foreign Application Priority Data

Apr. 5, 2019 (JP) .............................. JP2019-072672

(51) Int. Cl.
G02F 1/1333        (2006.01)
G02F 1/1335        (2006.01)

(52) U.S. Cl.
CPC .. G02F 1/133308 (2013.01); G02F 1/133512 (2013.01); *G02F 2001/133314* (2013.01); *G02F 2202/28* (2013.01); *G02F 2203/02* (2013.01)

(58) Field of Classification Search
None
See application file for complete search history.

(56) References Cited

U.S. PATENT DOCUMENTS

2014/0176850 A1 * 6/2014 Kim ........................ F21V 15/04
349/58

FOREIGN PATENT DOCUMENTS

JP         2009-163131 A        7/2009

* cited by examiner

*Primary Examiner* — James A Dudek
(74) *Attorney, Agent, or Firm* — Oblon, McClelland, Maier & Neustadt, L.L.P.

(57) ABSTRACT

According to one embodiment, a display device includes a display panel including a display surface and a rear surface located in an opposite side to the display surface, a support plate including a first main surface opposing the rear surface of the display panel, a second main surface located in an opposite side to the first main surface and a first opening opposing at least a central portion of the display panel, and an adhesive tape disposed on the second main surface so as to be overlaid on the first opening, and including a first adhesive region attached on the second main surface around the first opening and a second adhesive region located in the first opening and attached on the rear surface of the display panel.

10 Claims, 10 Drawing Sheets

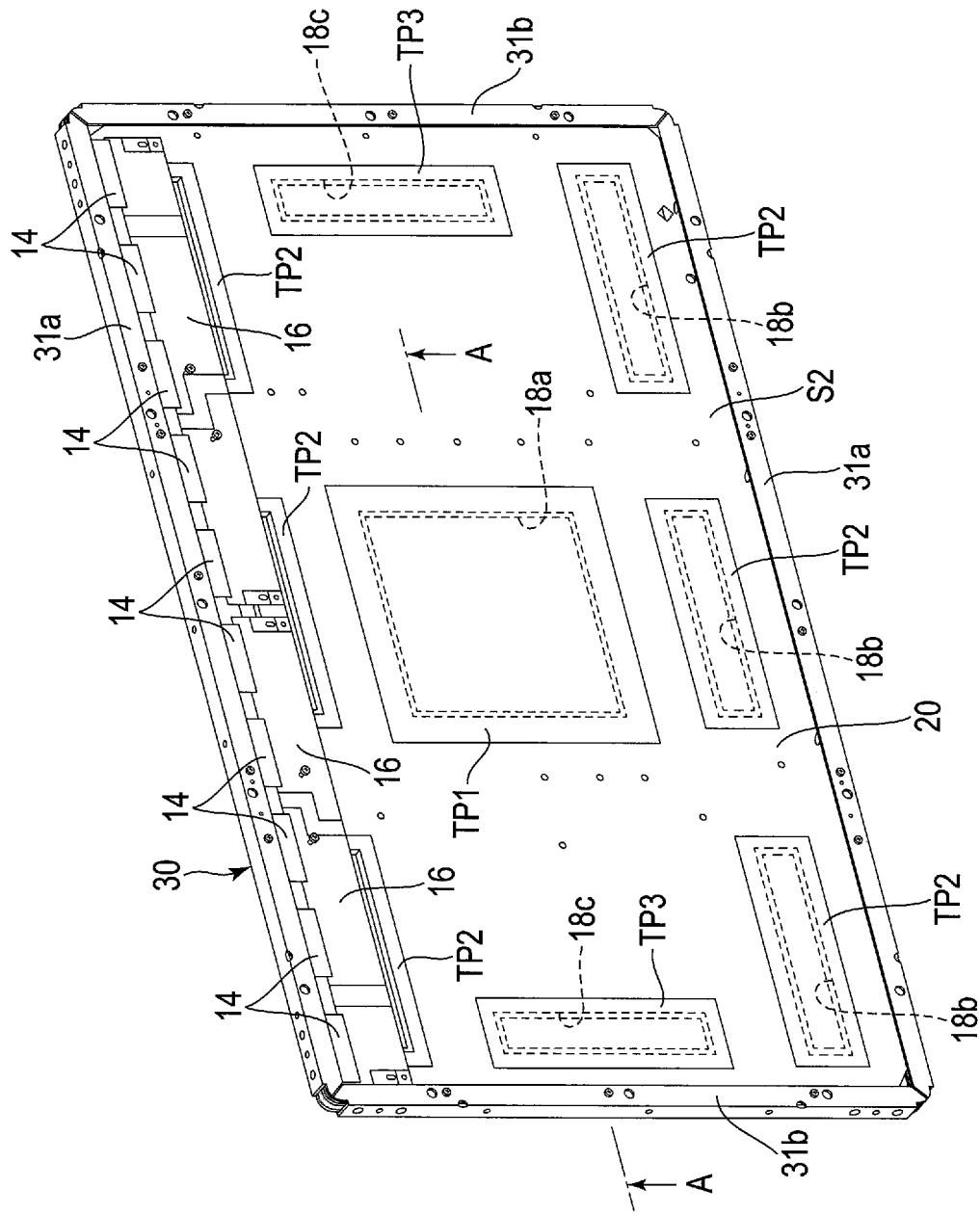
F I G. 3

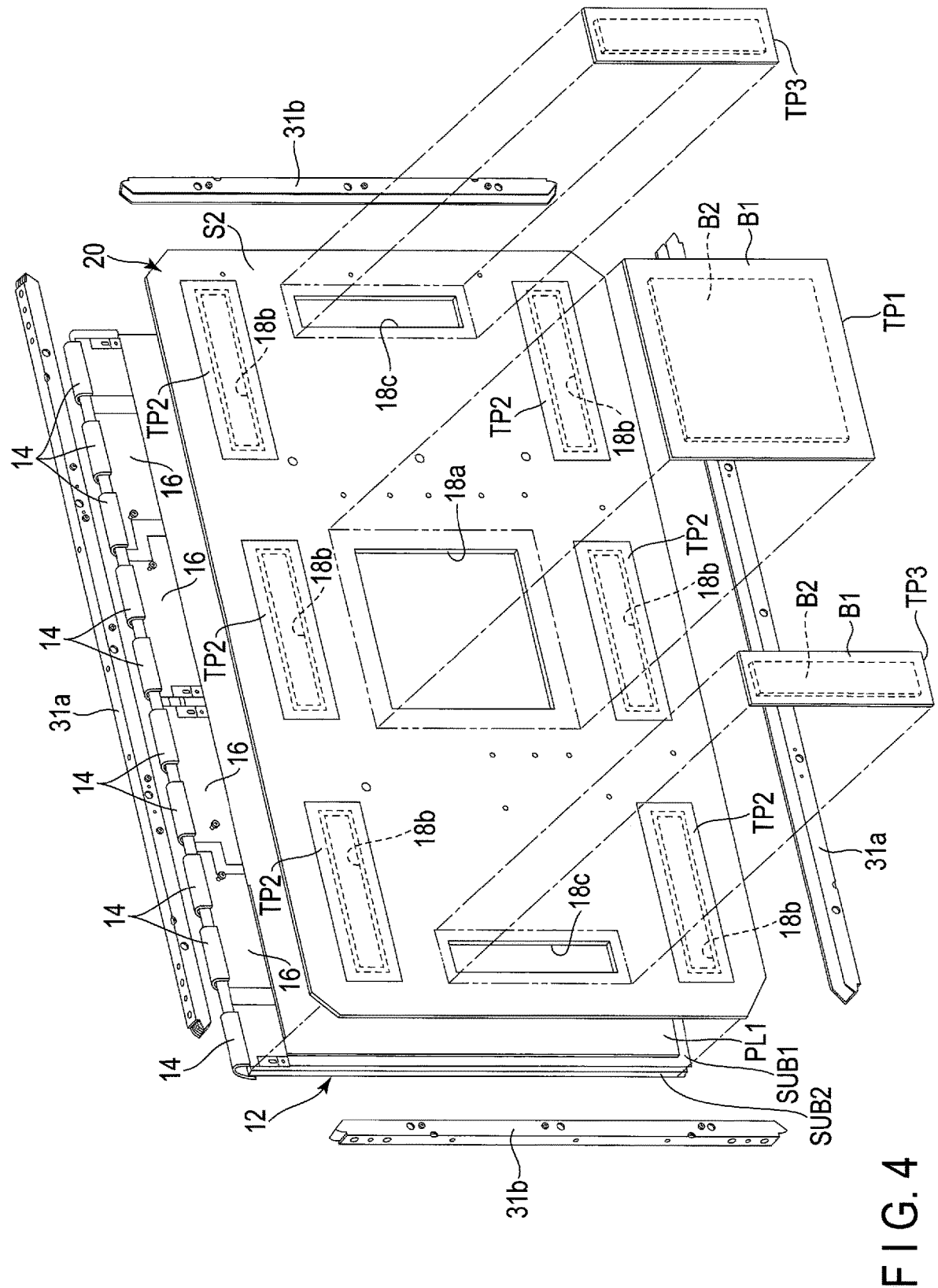
F I G. 4

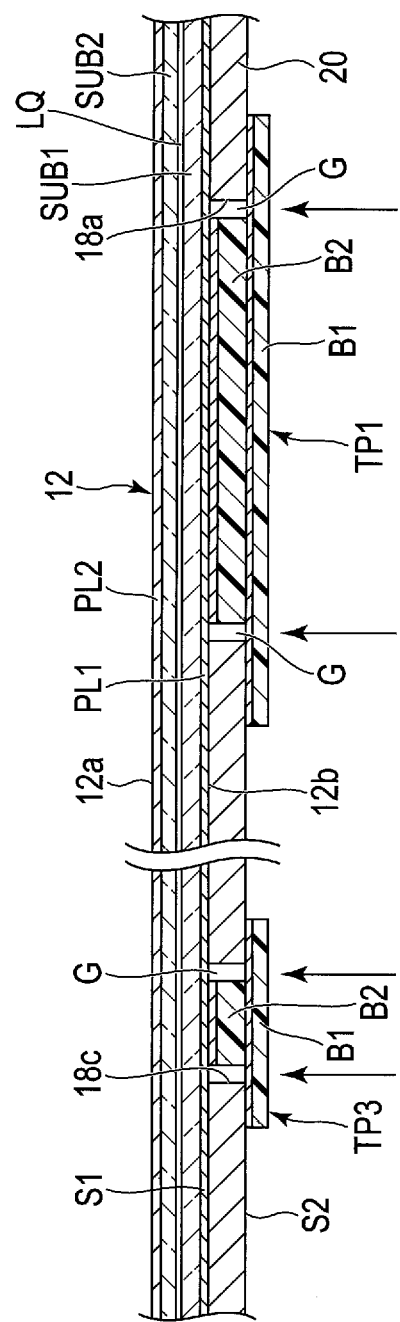
F I G. 5

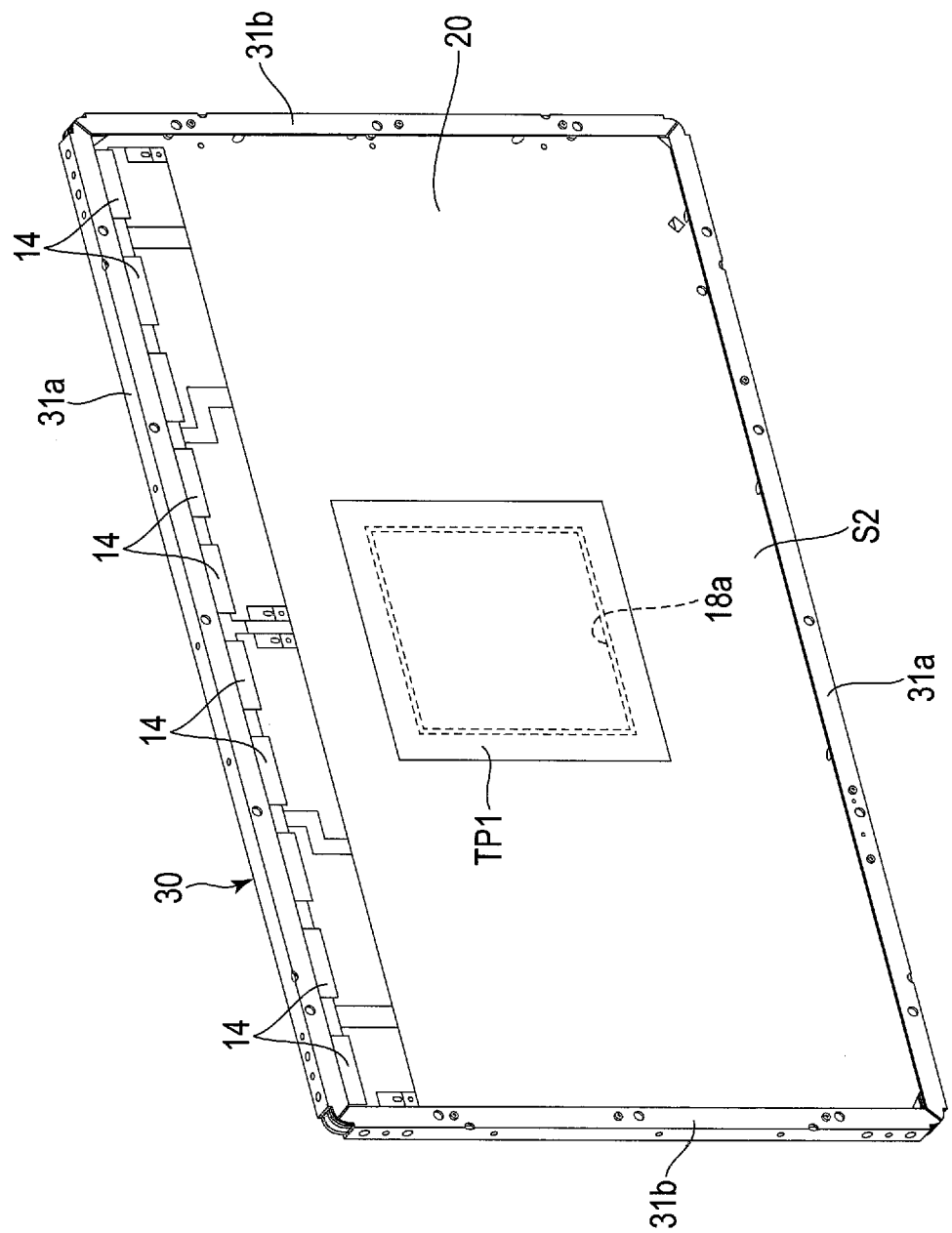
F I G. 13

DISPLAY DEVICE

CROSS-REFERENCE TO RELATED APPLICATIONS

This application is based upon and claims the benefit of priority from Japanese Patent Application No. 2019-072672, filed Apr. 5, 2019, the entire contents of which are incorporated herein by reference.

FIELD

Embodiments described herein relate generally to a display device.

BACKGROUND

Liquid crystal display devices are employed even more widely as a display panel for digital signage (electronic signboard). Generally, signage-use display panels have a structure in which the peripheral portions of the panel are held by a frame member. In recent years, in the signage-use display panels as well, the size of the screen is enlarged and its frame is narrowed. Under these circumstances, with merely holding the periphery portion of the display panel by the holder structure, it is still difficult to maintain sufficient durability to external force which acts when, for example, such as falling or shaking.

BRIEF DESCRIPTION OF THE DRAWINGS

FIG. 3 is a perspective view showing a rear surface side of a display panel and a support plate in the display device.

FIG. 4 is an exploded perspective view showing the display panel, support plate and the frame.

FIG. 5 is a cross section of the display panel, the support plate and an adhesive tape taken along line A-A of FIG. 3.

FIG. 13 is a perspective view showing a rear surface side of a display panel and a support plate of a display device according to a fourth modified example.

DETAILED DESCRIPTION

Figure 1:
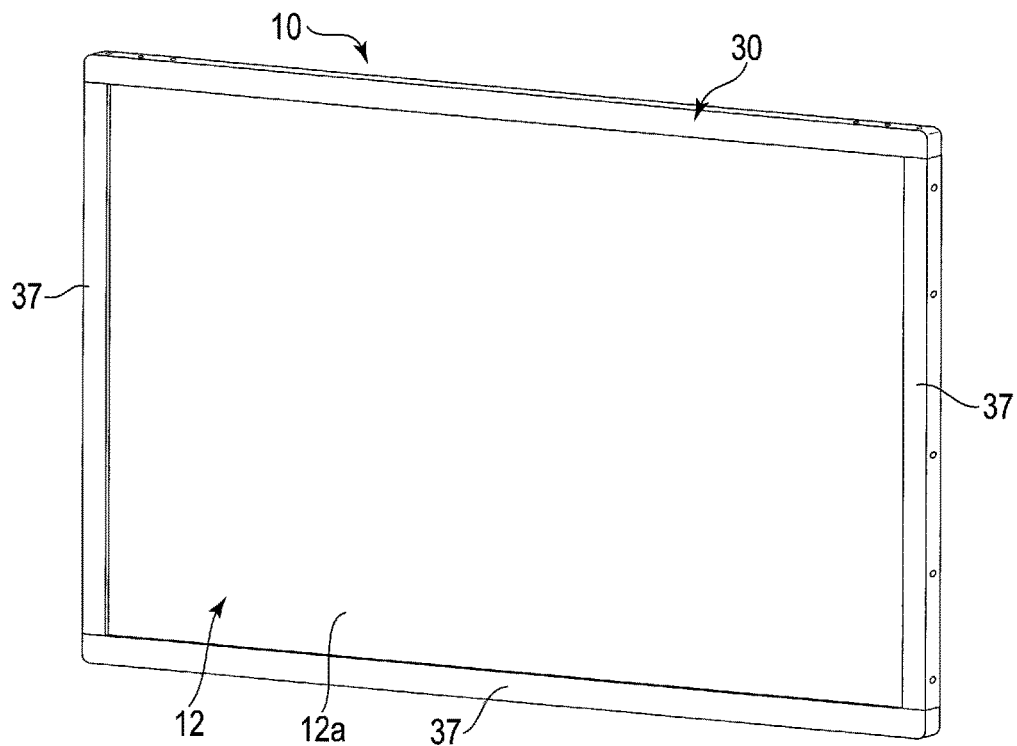
FIG. 1 is a perspective view showing a display surface side of a display device according to a first embodiment.

Various embodiments will be described hereinafter with reference to the accompanying drawings. In general, according to one embodiment, a display device comprises a display panel comprising a display surface and a rear surface located in an opposite side to the display surface, a support plate comprising a first main surface opposing the rear surface of the display panel, a second main surface located in an opposite side to the first main surface and a first opening opposing at least a central portion of the display panel, and an adhesive tape disposed on the second main surface so as to be overlaid on the first opening, and comprising a first adhesive region attached on the second main surface around the first opening and a second adhesive region located in the first opening and attached on the rear surface of the display panel.

What is disclosed in this specification is merely an example. Appropriate modifications which can be easily conceived by a person ordinarily skilled in the art without departing from the spirit of the embodiments naturally fall within the scope of the present invention. To further clarify explanation, for example, the width, and thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

Figure 2:
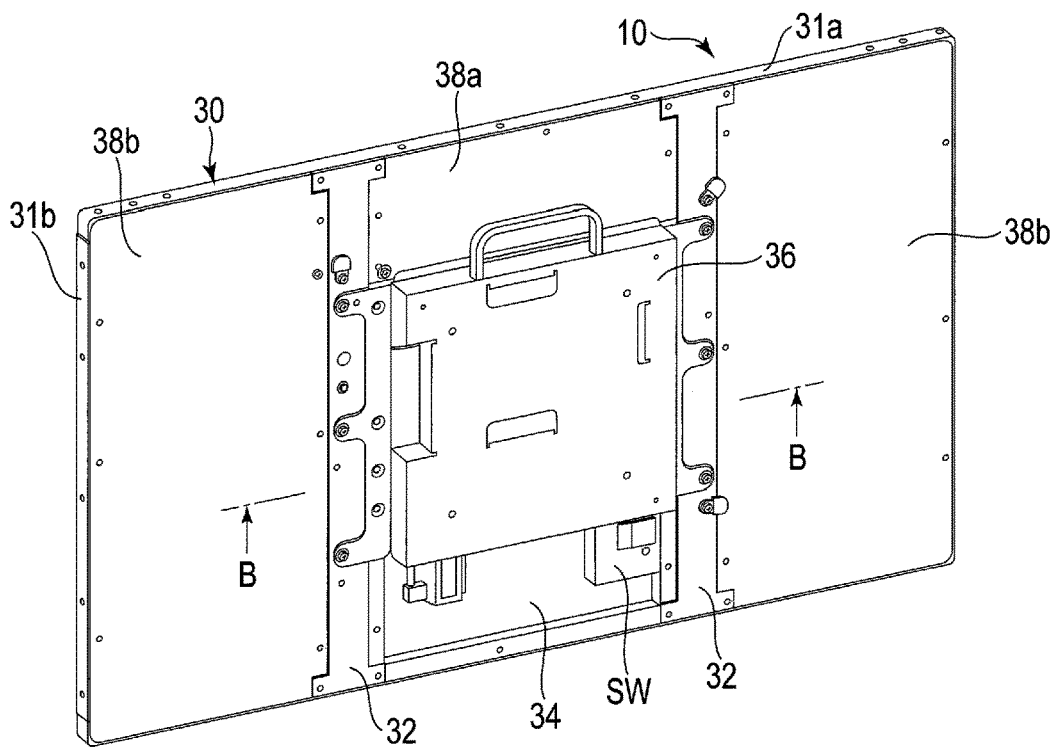
FIG. 2 is a perspective view showing a rear surface side of the display device.

FIG. 1 is a perspective view showing a display surface side of a display device according to a first embodiment, and FIG. 2 is a perspective view showing a rear surface side of the display device.

A display device 10 is employed as, for example, a display device for digital signage.

As shown in FIG. 1, the display device 10 comprises, as a display panel, an active-matrix liquid crystal display panel (liquid crystal panel) 12, a support plate 20 disposed to oppose a rear surface of the liquid crystal panel 12, which will be described later, and a frame 30 which supports side edge portions of the support plate 20. The liquid crystal panel 12 is a reflective liquid crystal display panel. The liquid crystal panel 12 includes, for example, a rectangular-shaped display surface 12a and a rear surface 12b opposite to the display surface 12a.

As shown in FIG. 2, the display device 10 comprises, in the rear surface side of the liquid crystal panel 12, a pair of bars 32 fixed to the frame 30, a plurality of rear surface plates (decorative plates) 38a and 38b attached to the frame 30 and the bars 32, electronic parts supported by the bars 32, and a protective cover 36 fixed to the bars 32 to cover the electronic parts.

FIG. 3 is a cross sectional view showing the rear surface side of the liquid crystal panel and the support plate. FIG. 4 is an exploded perspective view of the liquid crystal panel, the support plate and the frame. FIG. 5 is a cross sectional view of the display panel, the support plate and the adhesive tape taken along line A-A of FIG. 3.

As shown in FIGS. 4 and 5, the liquid crystal panel 12 comprises a rectangular-shaped first substrate SUB1, a rectangular-shaped second substrate SUB2 disposed to oppose the first substrate SUB1, and a liquid crystal layer LQ provided between the first substrate SUB1 and the second substrate SUB2. The first substrate SUB1 and second substrate SUB2 are each formed from a transparent insulating substrate such as a glass or resin plate. A peripheral portion of the second substrate SUB2 is attached onto the first substrate SUB1 by a sealing member. A polarizer PL2 is attached on a surface of the second substrate SUB2, so as to form the display surface 12a of the liquid crystal panel 12. In the structure shown in FIG. 5, a polarizer PL1 as well is attached onto the surface (a rear surface of the liquid crystal panel 12) of the first substrate SUB1. That is, the polarizer PL1 is placed to abut to the support plate 20. Alternatively, such a structure is also applicable that the liquid crystal panel 12 is without a polarizer PL1, and in which case, the first substrate SUB1 of the liquid crystal panel 12 directly abuts to the support plate 20.

In the liquid crystal panel 12, when the display surface 12a is seen in plan view (which is a state of viewing the liquid crystal panel from a normal direction of the surface of the liquid crystal panel, and this is also the case hereinafter), a rectangular-shaped display area (active area) is provided in a region of an inner side of the sealing member. On an inner surface of the first substrate SUB1, a number of wiring lines including a plurality of signal lines and scanning lines (not shown), a plurality of pixel electrodes which form pixels, a thin film transistor and the like are provided in the display area. Moreover, in the display area, common electrodes are provided in the first substrate SUB1 or the second substrate SUB2, so as to oppose the pixel electrodes, respectively.

The liquid crystal panel 12 employed here is a reflective type. More specifically, reflective liquid crystal panels display images by selectively reflecting light such as external light and fill light, towards the first substrate SUB1 from a display surface 12a side.

Note that the liquid crystal panel 12 may adopt such a configuration that the thickness taken from the rear surface of the first substrate SUB1 to the front surface of the second substrate SUB2 is the same as or less than that of the support plate 20, which will be described later.

Such a configuration may as well be adopted that the thickness taken from the rear surface of the first substrate SUB1 to the front surface of the polarizer PL1 is the same as or less than that of the support plate 20, which will be described later.

Or, the liquid crystal panel 12 may adopt such a configuration that one or both of the first substrate SUB1 and the second substrate SUB2 have a thickness the same as or less than that of the support plate 20.

As shown in FIG. 4, an end of each of a plurality of flexible printed circuit boards (FPC) 14 is joined to a long edge-side end portion of the first substrate SUB1, to be electrically connected to the respective wiring lines of the first substrate SUB1. The FPCs 14 are each bent to a rear surface side of the first substrate SUB1 and an extending end thereof is connected to a respective printed circuit substrate 16. Electronic parts such as drive ICs (not shown) are mounted on these printed circuit substrates 16.

As shown in FIGS. 3 to 5, the display device 10 comprises the support plate 20 which supports the liquid crystal panel 12. The support plate 20 is formed from a flat metal plate such as of stainless steel, aluminum or the like, and comprises a first main surface (front surface) S1 and a second main surface (rear surface) S2 that opposes the first main surface. The support plate 20 is formed into a rectangular shape, and has a width and lengths greater than the dimensions (width and length) of the liquid crystal panel 12. In the support plate 20, the first main surface S1 is disposed to oppose the rear surface 12b of the liquid crystal panel 12. An outer circumferential portion of the support plate 20 extends out from the outer circumferential edge of the liquid crystal panel 12. As will be described later, the liquid crystal panel 12 is attached onto the support plate 20 with a plurality of adhesive tapes, and fixedly supported by the support plate 20. Further, the outer circumferential portion of the support plate 20 is screwed to the frame 30.

The holder structure of the liquid crystal panel 12 will now be described in detail.

The support plate 20 comprises a first opening (through hole) 18a formed in a central portion of the support plate 20. The support plate 20 further comprises six second openings 18b located along each respective long-edge side, and two third openings 18c provided along each short-edge side in the peripheral portion of the support plate 20.

For example, the first opening 18a is formed into a square shape, and each side edge of the first opening 18a extends parallel to the respective long-edge and the respective short-edge side of the support plate 20. The second openings 18b are each formed into a long and slender rectangular shape and a pair of long edges of each second opening 18b extend parallel to the long sides of the support plate 20. Furthermore, the third openings 18c are each formed into a long and slender rectangular shape, and a pair of long sides of each third opening 18c extend parallel to the short edges of the support plate 20. The first opening 18a has dimensions and an area sufficiently greater than those of each of the second openings 18b and the third openings 18c.

Note that the shape of each opening is not limited to a rectangular shape, but can be selected from various shapes such as circular, elliptical and polygonal. The number of the second and third openings 18b and 18c provided is not limited to those mentioned above, but can be increased or decreased arbitrarily if needed. Furthermore, the positions of the second and third openings 18b and 18c provided can be changed arbitrarily.

The liquid crystal panel 12 is attached to the support plate 20 with the adhesive tapes and is supported by the support plate 20. The adhesive tapes include a first adhesive tape TP1 corresponding to the first opening 18a, six second adhesive tapes TP2 corresponding to the second openings 18b and two third adhesive tapes TP3 corresponding to the third openings 18c.

For example, the first adhesive tape TP1 is formed into a similar square of that of the first opening 18a and in dimensions greater than those the first opening 18a. The first adhesive tape TP1 has an area greater than that of the first opening 18a. The first adhesive tape TP1 comprises a sheet-shaped base material formed of a resin such as polyethylene terephthalate and an adhesive material layer formed on a surface of the base material. Moreover, in this embodiment, the first adhesive tape TP1 is formed by stacking two adhesive tapes of difference sizes one on another. More specifically, the first adhesive tape TP1 comprises a square-shaped first layer B1 having an area greater than that of the first opening 18a, and a square-shaped second layer B2 stacked on a central part of the first layer B1. The second layer B2 has a square shape with dimensions slightly less than those the first opening 18a. The first layer B1 and the second layer B2 are each formed of the base material and the adhesive layer described above. Further, the second layer B2 (more detail, the base material of the second layer B2) has elasticity in its thickness direction, and the thickness of the layer thereof before attached to the liquid crystal panel 12 is slightly greater than the thickness of the support plate 20.

The first adhesive tape TP1 is disposed so as to cover the first opening 18a and also so that the second layer B2 is located in the first opening 18a, and the outer circumferential portion (the first adhesive region) of the first layer of B1 is attached to the second main surface S2 of the support plate 20 around the first opening 18a. At the same time, the second layer (second adhesive region) B2 is attached to the rear surface 12b of the liquid crystal panel 12 through the first opening 18a. Thus, the central portion of the display panel 12 is attached and fixed to the support plate 20 via the first adhesive tape TP1. Here, the second layer B2 is compressed to about the thickness of the support plate 20, and is interposed between the first layer B1 and the liquid crystal panel 12 while storing the elastic restoring force.

Here, an annular gap G is created between the outer circumferential edge of the second layer B2 and the inner circumferential edge of the first opening 18a. The gap C is formed over the entire inner circumferential edge of the first opening 18a. For example, when the first layer B1 is formed of such a transparent resin as described above, the gap G can be visually recognized from the outside of the support plate 20 through the first layer B1. In the first layer B1, a rectangular region opposing the gap G, i.e., the region along the periphery of the first opening 18a forms a cuttable region which can be cut with a cutter or the like. For example, as indicated by an arrow in FIG. 5, an edge of a cutter is inserted to the gap G from the outside of the support plate 20 through the first layer B1 and further the cutter 1 is moved once around along the gap G, and thus the first layer B1 can be cut around the cuttable region. Thus, the adhesion by the first adhesive tape TP1 is canceled, making it possible to easily remove the liquid crystal panel 12 from the support plate 20.

The second adhesive tapes TP2 and the third adhesive tapes TP3 are different in size, but they have a structure similar to that of the first adhesive tape TP1. The third adhesive tapes TP3 will now be described as a typical example. For example, the third adhesive tapes TP3 are formed into a similar rectangular shape to that of the third opening 18c, in dimensions greater than those of the third openings 18c, and have an area greater than that of the third opening 18c. The third adhesive tapes TP3 are each formed by stacking two adhesive tapes one on another. More specifically, the third adhesive tapes TP3 each comprise a rectangular-shaped first layer B1 having an area greater than that of the third opening 18c and a rectangular-shaped second layer B2 stacked on a central part of the first layer B1. The second layer B2 has a rectangular shape with dimensions slightly less than those of the third opening 18c. The first layer B1 and the second layer B2 each comprise a sheet-like base material formed of a resin such as polyethylene terephthalate and an adhesive layer formed on a surface of the base material. The thickness of the second layer B2 is set slightly greater rather than that of the support plate 20.

The third adhesive tape TP3 is disposed so as to cover the third opening 18c and so that the second layer B2 is located in the third opening 18c, and the outer circumferential edge (the first adhesive region) the first layer B1 is attached to the second main surface S2 of the support plate 20 around the third opening 18c. At the same time, the second layer (second adhesive region) B2 is attached onto the rear surface 12b of the liquid crystal panel 12 through the third opening 18c. An annular gap G is created between the outer circumferential edge of the second layer B2 and the inner circumferential edge of the third opening 18c. The gap G is formed over the entire inner circumferential edge of the third opening 18c.

Similarly, each of the second adhesive tapes TP2 is disposed so as to cover the respective second opening 18b and so that the second layer B2 is located in the second opening 18b, and the outer circumferential edge (the first adhesive region) of the first layer B1 is attached on the second main surface S2 of the support plate 20 around the second opening 18b. At the same time, the second layer (second adhesive region) B2 is attached on the rear surface 12b of the liquid crystal panel 12 through the second opening 18b. A gap G is created between the outer circumferential edge of the second layer B2 and the inner circumferential edge of the second opening 18b. The gap G is formed over the entire inner circumferential edge of the third opening 18c.

Thus, the outer peripheral portion of the liquid crystal panel 12 is attached and fixed to the support plate 20 with the second adhesive tape TP2 and the third adhesive tapes TP3. Note that as in the case of the first adhesive tape TP1, the second adhesive tapes TP2 and the third adhesive tapes TP3 can be cut along the gap G.

Figure 6:
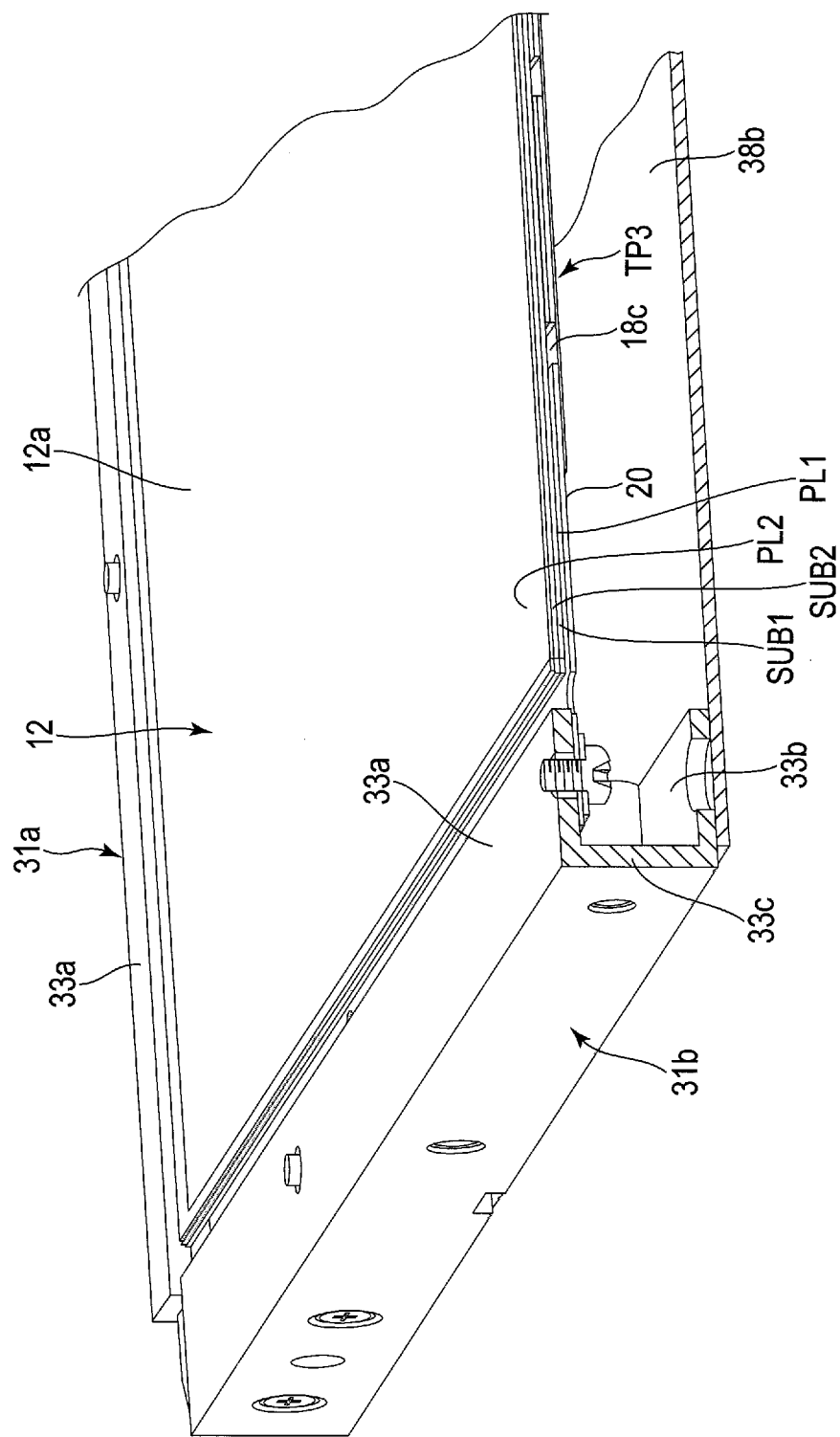
FIG. 6 is a partially exploded perspective view showing the display panel, the support plate and the frame.

FIG. 6 is a partially exploded perspective view of the liquid crystal panel, the support plate and the frame.

As shown in FIGS. 3, 4 and 6, each of the edge portions of the outer circumference of the support plate 20 is fixed by screw to the frame 30. The frame 30 comprises a pair of first frame members 31a fixed to the long side portions of the support plate 20, and a pair of second frame members 31b fixed to the short side portions of the support plate 20. The first frame members 31a and the second frame members 31b are joined to each other by both ends to form the frame 30.

Each of the first frame members 31a and the second frame members 31b is formed from a steel material having a U-shaped cross section. That is, each of the first frame members 31a and the second frame members 31b comprises a first flange 33a and a second flange 33b placed to oppose each other and a web 33c that connects the first flange 33a and the second flange 33b to each other as an integrated one body. Each of the side edge portions of the support plate 20 is placed to abut to the inner surface of the first flange 33a and screwed thereto. An extending end of the first flange 33a is located to oppose a side edge of the liquid crystal panel 12 with a slight gap therebetween. Moreover, the thickness of the liquid crystal panel 12 is set substantially the same as that of the first flange 33a. The second flange 33b is placed to oppose the support plate 20 with a gap therebetween.

Figure 7:
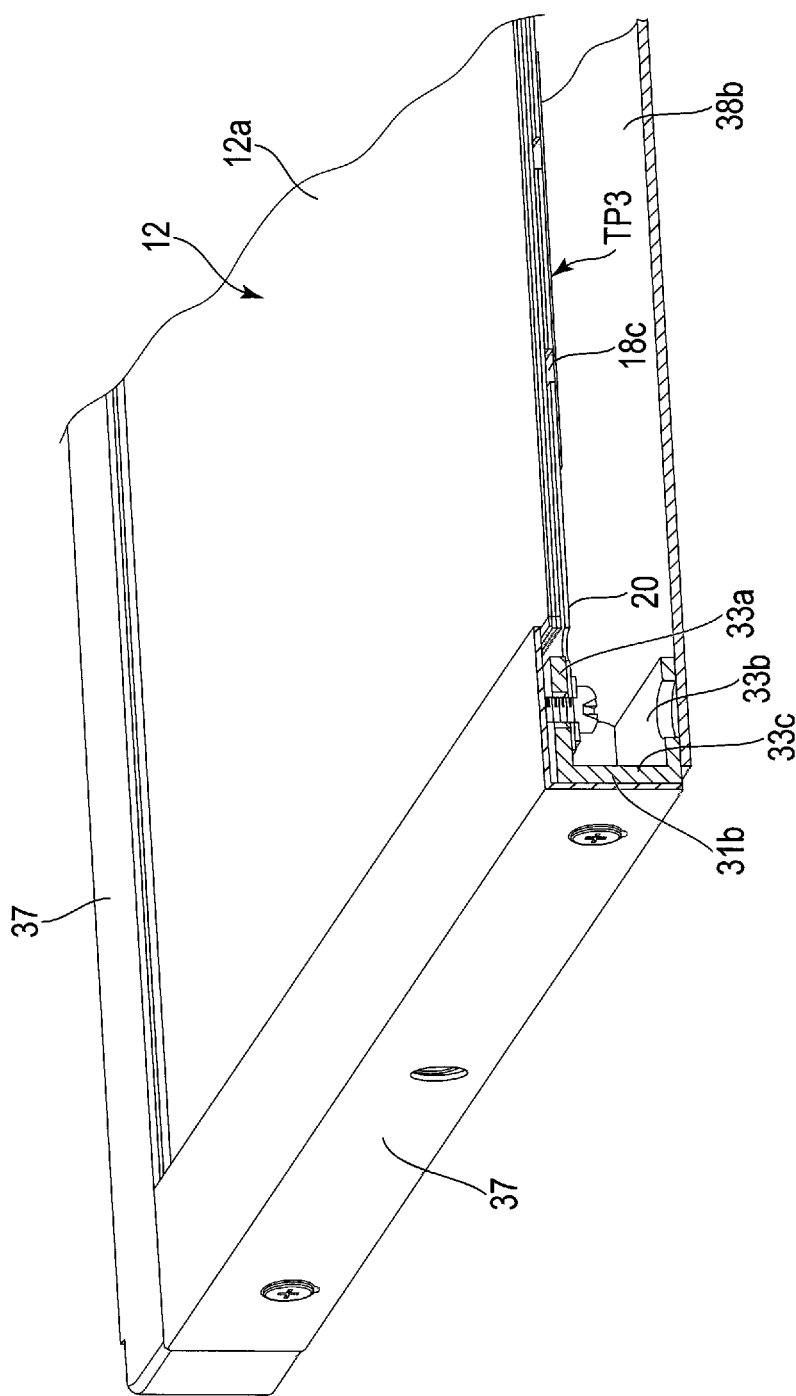
FIG. 7 is a partially exploded perspective view showing the display panel with a decorative cover attached thereon, the support plate, and the frame.

FIG. 7 is a partially exploded perspective view of the liquid crystal panel, the support plate and the frame.

As shown, a decorative frame member 37 is attached onto the first frame members 31a and the second frame members 31b of the frame 30. The decorative frame member 37 is formed to have an L shape in cross section, and is provided onto the first flange 33a and the web 33c of the first frame members 31a and the second frame members 31b. An extending end of the decorative frame member 37 covers outer edges of the liquid crystal panel 12.

Figure 8:
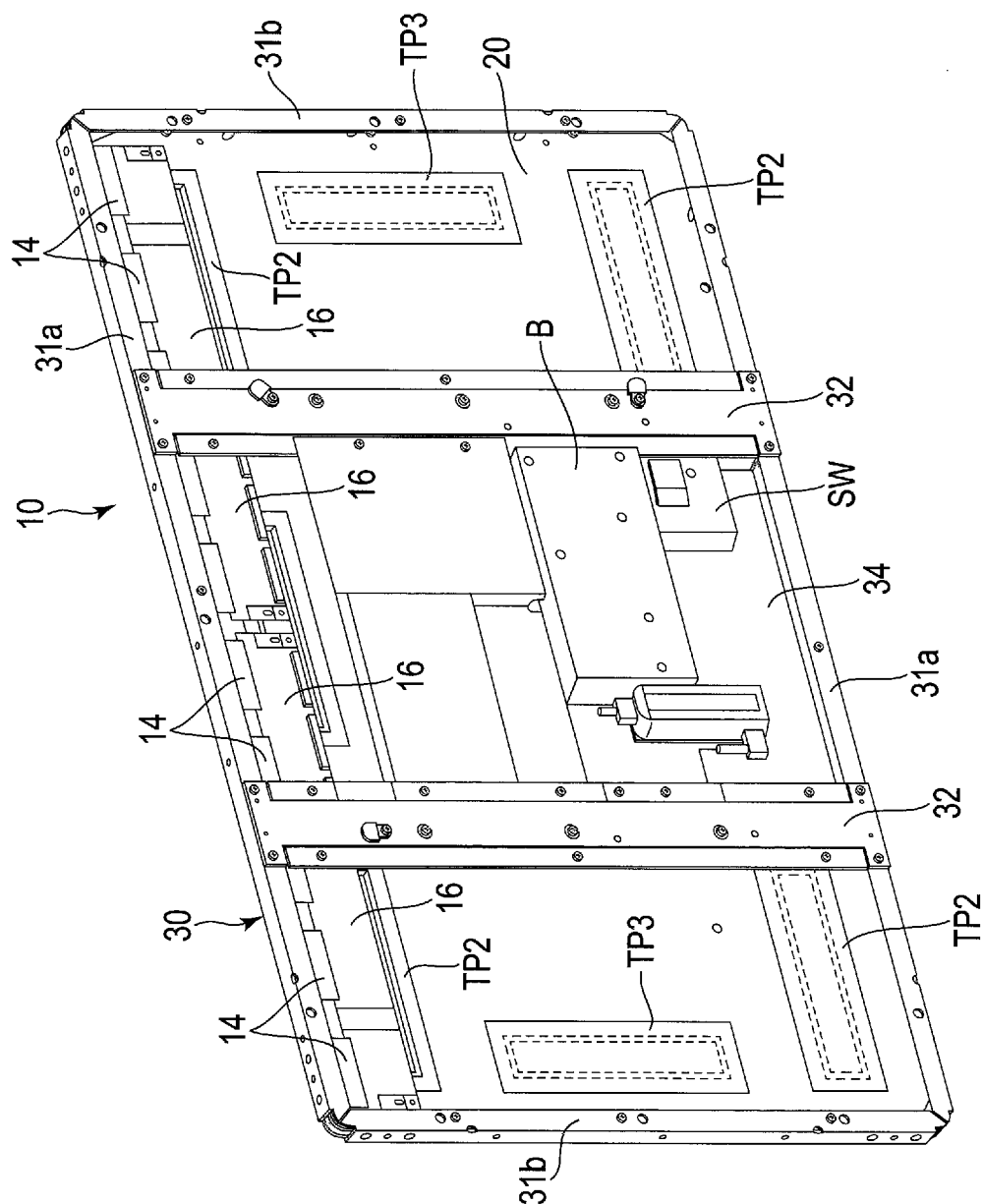
FIG. 8 is a perspective view showing a rear surface side of the display device when a decorative plate and a protective cover are removed.
Figure 9:
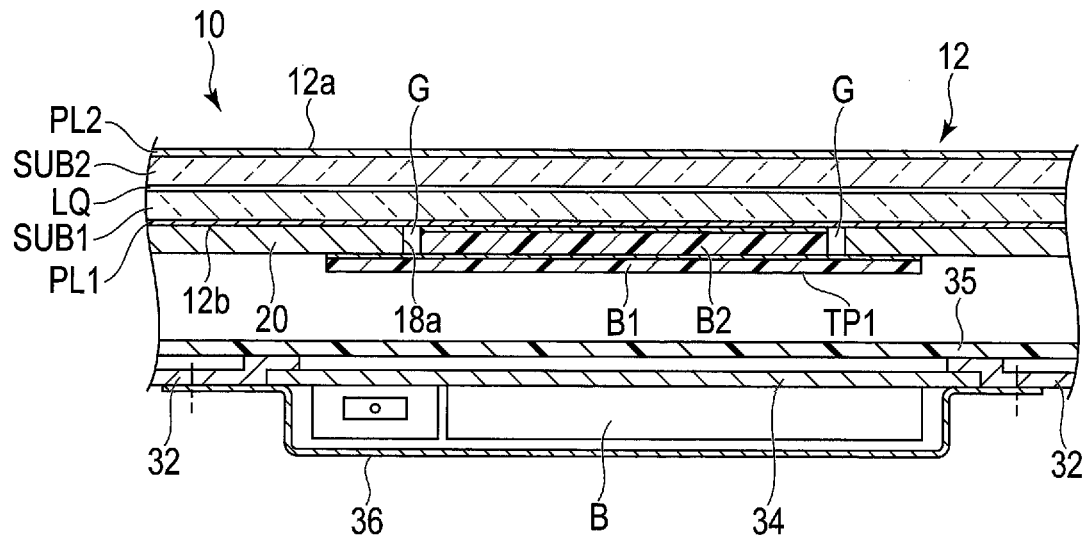
FIG. 9 is a sectional view of the display device taken along line B-B of FIG. 2.

FIG. 8 is a perspective view showing a rear surface side of the display device when the decorative plate and the protective cover are removed, and FIG. 9 is a cross section of the display device taken along line B-B of FIG. 2.

As shown in FIG. 8, the display device 10 comprises a pair of bars 32 fixed to the frame 30 in the rear surface side of the liquid crystal panel 12. The bars 32 are arranged parallel to each other while keeping a gap therebetween. One longitudinal end of each of the bars 32 is fixed on the second wall 33b of one first frame member 31a, and the other longitudinal end of is fixed on the second wall 33b of the other first frame member 31a. A base plate 34 is attached to the pair of bars 32, so as to oppose the support plate 20 with a gap therebetween. On an inner surface of the base plate 34 (which is a surface opposing the support plate 20), a printed circuit board 35 is attached so as to oppose the support plate 20 with a gap therebetween (see FIG. 9). The plurality of FPCs 14 and the circuit substrates 16, which extend from the liquid crystal panel 12, are electrically connected to the printed circuit board 35 via wiring lines or connectors (not shown). On the base plate 34, a battery B, a power switch SW and other drivers are mounted.

As shown in FIG. 2, the protective cover 36 is fixed to the pair of bars 32. The protective cover 36 covers the battery B and other drivers. Further, a plurality of, for example, three decorative plates 38a and 38b are attached to the second walls 33b and the pair of bars 32 of each frame member of the frame 30, so as to cover the rear surface of the display device 10, thus constituting the rear surface of the support plate 20.

As shown in FIG. 9, in the display device 10, the battery B, which is a heating body, opposes at least a part of the first adhesive tape TP1 via the base plate 34 and the printed circuit board 35. The first adhesive tape TP1 is formed from a resin sheet and is interposed between the battery B and the liquid crystal panel 12. With this structure, the first adhesive tape TP1 functions also as a thermal insulator which insulates the heat transmittable from the battery B to the liquid crystal panel 12.

According to the display device 10 of the first embodiment configured as above, the central portion of the liquid crystal panel 12 is fixedly held on the support plate 20 with the first adhesive tape TP1, and thus the central portion of the liquid crystal panel 12 is reinforced and supported directly by the support plate 20. With this structure, even if an external shock is applied on the display device 10, the central portion of the liquid crystal panel 12 is not curved, and the flatness of the screen can be maintained. At the same time, cracking of the liquid crystal panel 12 can be prevented. The first adhesive tape TP1 can exhibit a shock attenuation effect which absorbs external force, thereby making it possible to further prevent the liquid crystal panel 12 from breaking. Thus, the display device with improved durability can be obtained.

Moreover, according to this embodiment, the first, second and third adhesive tapes TP1, TP2 and TP3 can be cut along the first, second and third openings 18a, 18b and 18c from the rear surface side of the support plate 20. By cutting the first, second and third adhesive tapes TP1, TP2 and TP3, the adhesion by the first, second and third adhesive tapes TP1, TP2 and TP3 is canceled, thereby making it possible to easily remove the liquid crystal panel 12 from the support plate 20. Thus, the operability of reworking, repair work and maintenance work on the display device 10 can be improved.

In the first embodiment, the first, second and third adhesive tapes TP1, TP2 and TP3 are shaped rectangular or square, but the outer shapes of the adhesive tapes are not particularly limited to this, but can be selected from various shapes. It suffices if the first, second and third adhesive tapes TP1, TP2 and TP3 each include a first adhesive region to be attached on the outer surface of the support plate 20 and a second adhesive region to be attached on the rear surface of the liquid crystal panel 12, and the outline shapes thereof may be formed into any shape. For the first layer B1 and the second layer B2 of each of the adhesive tapes TP1, TP2 and TP3, the materials thereof are not limited to transparent resin base materials, but, for example, a light-shielding resin base material such as a black resin base material may be used.

Next, a display device according to a modified example will be described. In modified examples to be described below, portions equivalent to those of the first embodiment are denoted by the same reference numbers and a detailed explanation thereof will be omitted. Such explanation will be mainly given to portions different from those of the first embodiment.

First Modified Example

Figure 10:
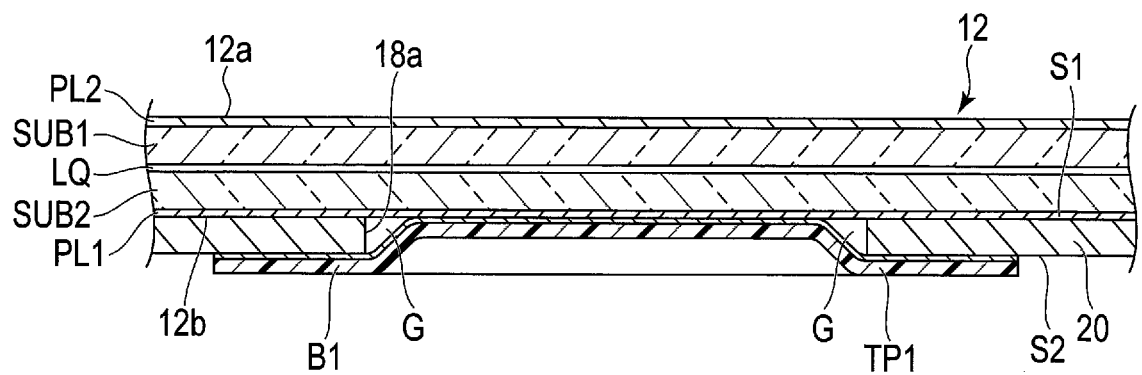
FIG. 10 is a cross sectional view of a display panel, a support plate and an adhesive tape of a display device according to a first modified example.

FIG. 10 is a cross sectional view of the display panel, support plate and adhesive tape of the display device, according to the first modified example. As shown, the adhesive tape is not limited to a two-layer adhesive tape, but an adhesive tape TP1 comprising a single layer B1 may be used. The adhesive tape TP1 is attached, by a peripheral portion thereof, on a second main surface S2 of a support plate 20 around a first opening 18a, and a central portion thereof is located in the first opening 18a and is attached on a rear surface 12b of the liquid crystal panel 12. Even in this case, a slight gap G is created between the periphery of the adhesive tape TP1 and the central portion.

For the base material of the adhesive tape TP1, a transparent resin or a light-shielding black resin can be used. Even if such an adhesive tape TP1 as above is used, an advantageous effect similar to that of the first embodiment described above can be obtained.

Second Modified Example

Figure 11:
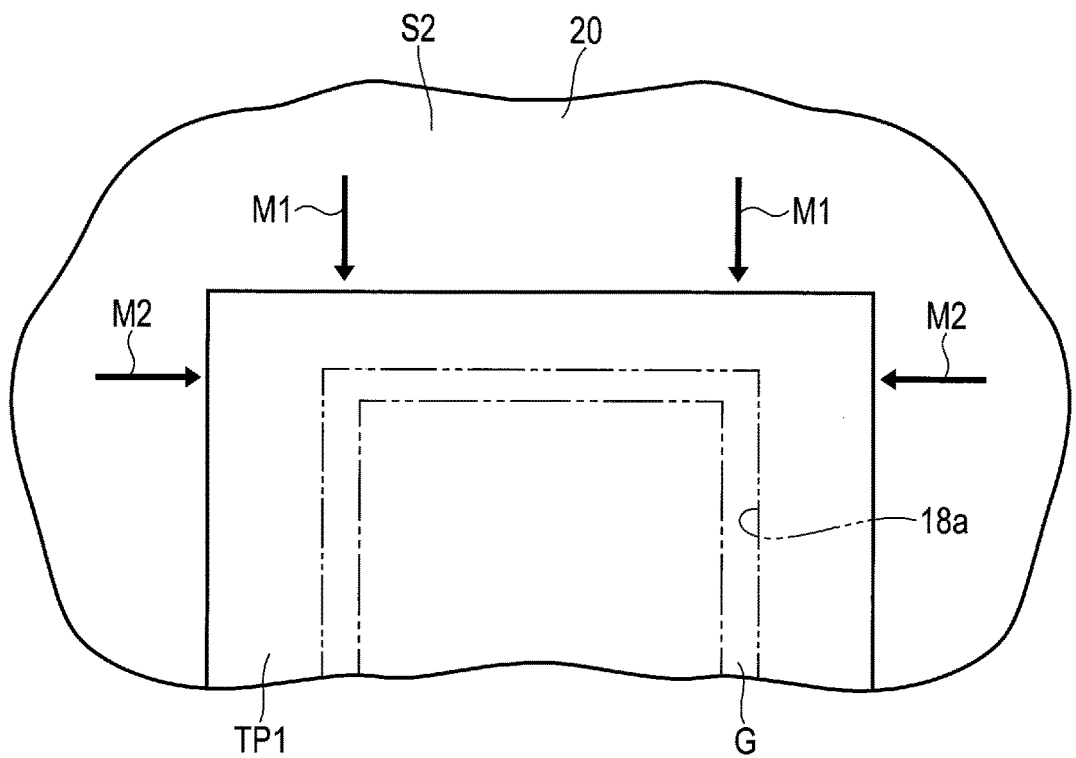
FIG. 11 is a plan view schematically showing a support plate and an adhesive tape of a display device according to a second modified example.

FIG. 11 is a plan view schematically showing the support plate and the adhesive tape of the display device according to the second modified example. As shown, indexes indicating cutting positions of the adhesive tape TP1 (positions corresponding to the gap G), that is, for example, arrow-shaped marks M1 and M2, are provided on the support plate 20. For the second adhesive tape and the third adhesive tape, similar marks M1 and M2 are provided on the support plate 20.

When cutting the adhesive tape TP1, cuttable regions of the adhesive tape TP1 can be easily identified with reference to the marks M1 and M2 as indexes. For example, when the base material of the adhesive tape TP1 is a black resin, the marks M1 and M2 are particularly effective.

Third Modified Example

Figure 12:
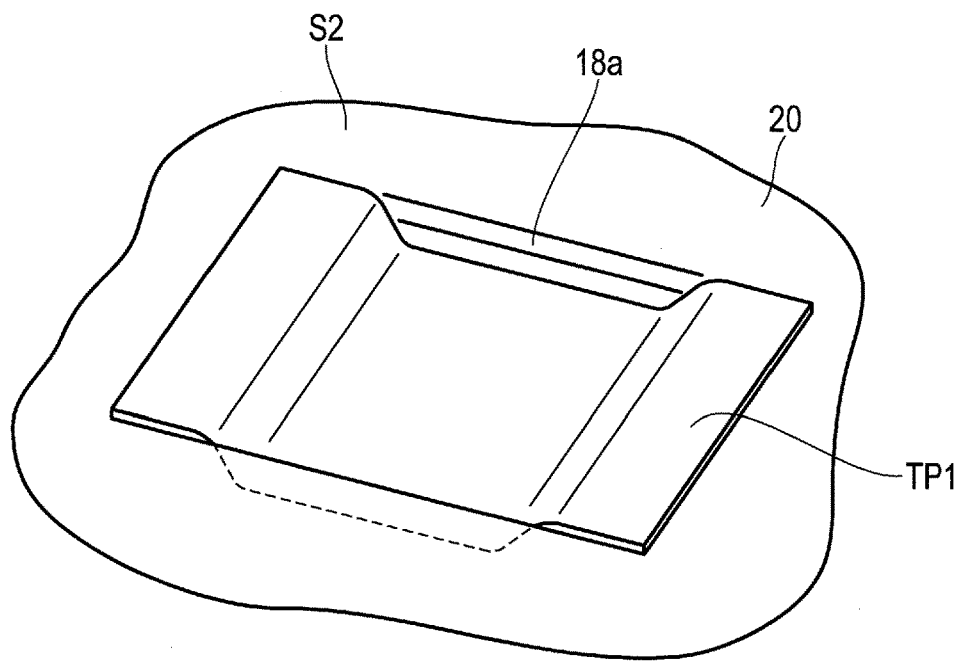
FIG. 12 is a perspective view schematically showing a support plate and an adhesive tape of a display device according to a third modified example.

FIG. 12 is a perspective view schematically showing the support plate and the adhesive tape of the display device according to the third modified example.

As shown, according to the third modified example, dimensions of the adhesive tape TP1 in one direction, for example, a dimension in a width direction is less than or equal to the dimensions of the first opening 18a in the width direction. A pair of opposing side edge portions of the adhesive tape TP1 are attached to the second main surface S2 of the support plate 20 on outer sides of a pair of opposing side edge portions of the first opening 18a counters, thus forming a first adhesive region. The central portion of the adhesive tape TP1 is located in the first opening 18a and attached on the rear surface of the liquid crystal panel, thus forming a second adhesive region.

As described above, the adhesive tapes are not limited to such a structure that they are formed in dimensions greater than those of the respective openings of the support plate 20 in all directions, but it suffices if they are formed in such a size and shape that have at least a pair of the first adhesive regions opposing each other across the central portion used as the second adhesive region.

Fourth Modified Example

FIG. 13 is a perspective view showing the rear surface side of the display panel and the support plate of the display device according to the fourth modified example. As shown, in the fourth modified example, the support plate 20 comprises only a first opening 18a provided in the central portion. Here, only the first adhesive tape TP1 is placed to cover the first opening 18a and is attached on the second main surface S2 of the support plate 20 and the rear surface of the liquid crystal panel.

In the fourth modified example as well, the central portion of the liquid crystal panel is fixedly held onto the support plate 20 by the first adhesive tape TP1 and thus the central portion of the liquid crystal panel can be reinforced. With this structure, even if an external shock is applied on the display device, the central portion of the liquid crystal panel is not curved, and the flatness of the screen can be maintained. At the same time, cracking of the liquid crystal panel can be prevented. Thus, a display device with improved durability can be obtained.

The present embodiments and modified examples are provided here only as examples, and they are not intended to limit the scope of their range of technology. The novel embodiments described above can be achieved in other various models, and as long as they stay within the scope of the invention and can be achieved with various omission, replacement, and modification to their details. The embodiments and modified examples are encompassed by the scope and concept of the invention and included within the range equal to the inventions recited in the claims.

Based on the structures which have been described in the above-provided embodiments and modifications, a person having ordinary skill in the art may achieve structures with arbitral design changes; however, as long as they fall within the scope and spirit of the present invention, such structures are encompassed by the scope of the present invention. For example, the outer and inner shapes of the structural members of the liquid crystal panel, the frame and the support plate are not limited to rectangular, but one or both of the outer and inner shapes may be in some other shape, for example, polygonal, circular, elliptical, a combination of any of these or the like when seen in plan view. The liquid crystal display devices are not limited to a flat shape but may be partially or entirely curved or inclined. The materials of the structural members are not limited to those of the examples provided above, but may be selected from various options. Further, the above-provided embodiments employ a reflective liquid crystal display panel as the display panel, but they are not limited to this. The embodiments can be applied to other types of display panels, examples of which are organic EL display devices, electrophoretic self-luminescent display devices, and micro-ELD display devices.

Furthermore, regarding the present embodiments described above, any advantage and effect which would be obvious from the description of the specification or arbitrarily conceived by a skilled person are naturally considered achievable by the present invention.

What is claimed is:

1. A display device comprising:
a display panel comprising a display surface and a rear surface located in an opposite side to the display surface;
a support plate comprising a first main surface opposing the rear surface of the display panel, a second main surface located in an opposite side to the first main surface and a first opening opposing at least a central portion of the display panel; and
an adhesive tape disposed on the second main surface so as to be overlaid on the first opening, and comprising a first layer comprising a first adhesive region attached on the second main surface around the first opening and a second layer stacked on the first layer, located in the first opening, and comprising a second adhesive region attached on the rear surface of the display panel, wherein
the second layer has elasticity in its thickness direction and is arranged in the first opening with being interposed between the first layer and the display panel and with being compressed to a thickness substantially equal to a thickness of the support plate.

2. The display device of claim 1, wherein
the first layer comprises a cuttable region between a periphery of the first opening and the second layer, which is apart from the rear surface of the display panel.

3. The display device of claim 1, wherein
the first layer has an area greater than an area of the first opening, and
the first adhesive region is formed into an annular shape located around the first opening and attached on the second main surface.

4. The display device of claim 1, wherein
a gap is provided between a periphery of the first opening and a periphery of the second layer, and the first layer comprises a cuttable region opposing the gap.

5. The display device of claim 1, wherein
the first layer comprises a base material formed of a light-transmitting material, and an adhesive layer formed on the base material.

6. The display device of claim 1, wherein
the first layer comprises a base material formed of a light-shielding black material, and an adhesive material layer formed on the base material.

7. The display device of claim 4, wherein
the support plate comprises a mark which suggests a position of the cuttable region of the adhesive tape.

8. The display device of claim 1, wherein
the support plate comprises a plurality of second openings provided around the first opening, and
the device further comprises a plurality of second adhesive tapes each disposed on the second main surface so as to be overlaid on each respective second opening and each comprising a first adhesive region attached on the second main surface around the respective second opening and a second adhesive region located in the respective second opening and attached on the rear surface of the display panel.

9. The display device of claim 1, wherein
the display panel is a reflective liquid crystal display panel.

10. A display device comprising:
a display panel comprising a display surface and a rear surface located in an opposite side to the display surface;
a support plate formed of a flat metal plate, comprising a first main surface opposing substantially entire of the rear surface of the display panel without interposing an adhesive between the first main surface and the rear surface, a second main surface located in an opposite side to the first main surface, and a first opening opposing at least a central portion of the display panel; and
an adhesive tape disposed on the second main surface to be overlaid on the first opening, and comprising a first adhesive region attached on the second main surface around the first opening and a second adhesive region located in the first opening and attached on the rear surface of the display panel.

\* \* \* \* \*